United States Patent [19]
Berry

[11] 3,762,874
[45] Oct. 2, 1973

[54] METHOD OF STERILIZING INDUSTRIAL PRODUCT-DISPENSING PLANTS

[75] Inventor: Jean-Luc Berry, Mesnil Sur L'Estree, France

[73] Assignee: E. P. Remy et Cie, Dreux, France

[22] Filed: June 22, 1971

[21] Appl. No.: 155,420

[30] Foreign Application Priority Data
July 29, 1970  France .................. 7027994

[52] U.S. Cl. ................. 21/57, 21/58, 134/22 R
[51] Int. Cl. ........ A61l 1/00, A61l 13/00, B08b 9/08
[58] Field of Search .................. 21/57, 58, DIG. 4; 134/22 R

[56]  References Cited
UNITED STATES PATENTS

| | | | |
|---|---|---|---|
| 2,075,845 | 4/1937 | Gross et al. | 21/57 UX |
| 2,344,536 | 3/1944 | Coey et al. | 21/57 X |
| 3,035,886 | 5/1962 | Hickey | 21/57 |
| 3,042,533 | 7/1962 | McConnell et al. | 21/57 X |
| 3,493,323 | 2/1970 | Demuth | 21/57 X |
| 3,533,840 | 10/1970 | Holm | 134/22 R |
| 3,624,213 | 11/1971 | Cherkas | 21/58 X |

Primary Examiner—Barry S. Richman
Attorney—Kenyon & Kenyon Reilly Carr & Chapin

[57] ABSTRACT

Method of sterilizing industrial plants, for the conditioning of foodstuffs, wherein a sterilizing fluid carried to a temperature higher than 100°C., for instance from 120° to 130° C., is made to circulate in the plant, the said sterilizing fluid being constituted, at least partially, by a compound selected among the compounds of the poly-alcohol group and whose vapor tension, at a temperature higher than 100° C. and in particular within the aforesaid range of temperatures, is lower than atmospheric pressure.

11 Claims, 1 Drawing Figure

PATENTED OCT 2 1973     3,762,874
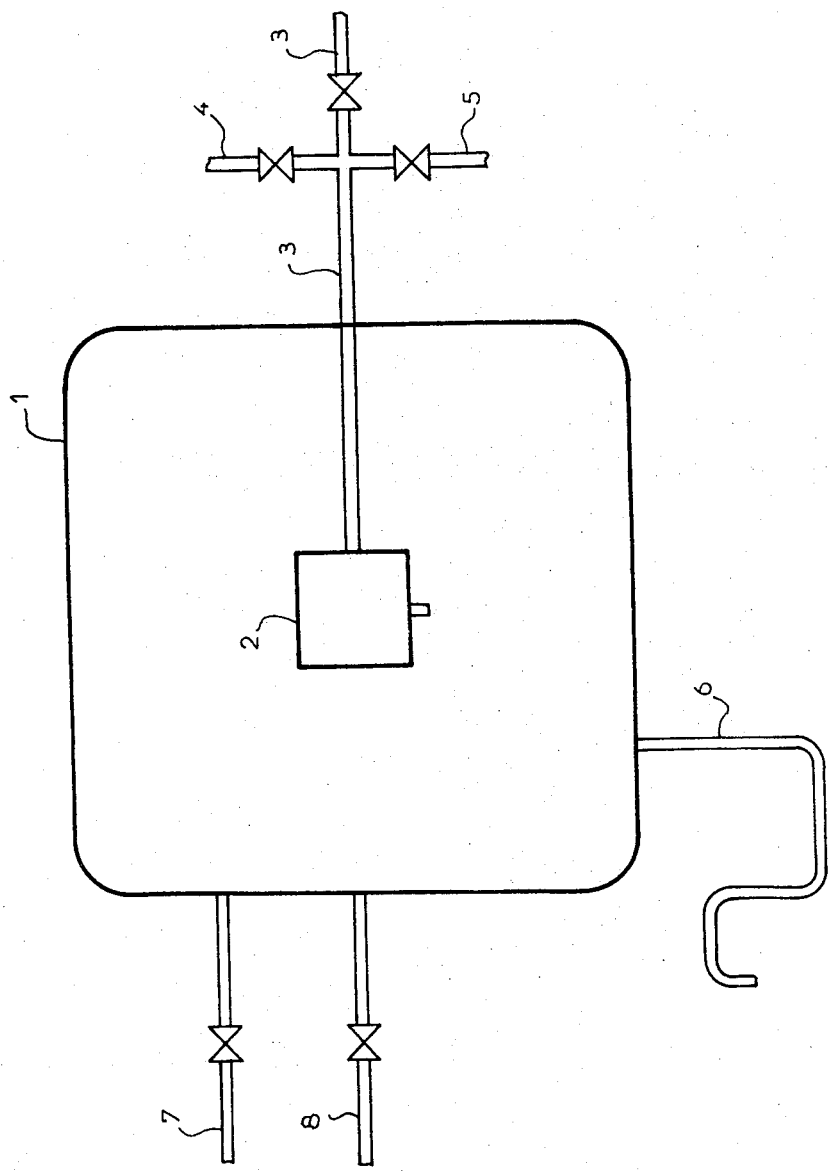
INVENTOR
JEAN-LUC BERRY
BY
Kenyon & Kenyon Reilly Carr & Chapin
ATTORNEYS

METHOD OF STERILIZING INDUSTRIAL PRODUCT-DISPENSING PLANTS

The present invention has essentially for its object and method of sterilizing industrial product-dispensing plants, in particular for the packaging or conditioning of foodstuffs such as milk products or the like.

It is known that plants of the aforesaid type must be periodically, often daily, cleaned from deposits and various impurities which accumulate in the apparatuses and pipings, as well as from the micro-organisms which contaminate the same.

To this end, the plant is subjected to successive cleaning and washing operations by means of a detersive solution, for instance an alkaline solution, and of a washing agent such as water, and thereafter to a treatment, the purpose of which is to render the same sterile. There are two kinds of sterilizing treatments known at present: chemical treatments and heat treatments.

Sterilizing by chemical means consists in making a bactericidal agent circulate in the plant. Such a treatment has various drawbacks: its action is purely superficial, i.e. it ensures efficient sterilizing of only the perfectly smooth surfaces, its action upon the rough surfaces or upon certain mechanical parts of the apparatuses, for instance the joints, being only partial or even practically null. The treatment moreover requires that the plant be in a previous state of perfect physical cleanness. Lastly, the bactericidal products used have a harmful effect on human organism and, therefore, they are dangerous for the operators when used in large amounts or in high concentrations; when used in small amounts, their bactericidal power is insufficient to ensure complete destruction of all the micro-organisms. Such a treatment by chemical means is a highly hygienic operation rather than a real sterilizing operation.

In the case of heat sterilizing, a heat-carrying liquid, water as a rule, is made to circulate in the various apparatuses and pipings of the plant, so as to raise the temperature of the plant to about 120° C during several minutes, in order to ensure a sufficient decimal reduction of the germs. Such a heat treatment offers the advantage of a higher efficiency as compared with the treatments by chemical means, for the whole plant, owing to the thermal conductivity of the metals from which it is made, actually reaches a temperature on the order of 120° C., which is necessary for the destruction of the micro-organisms. However, this method has the drawback of requiring that the water be used under a pressure higher than atmospheric, comprised as a rule between 1 and 2 bars. The sterilizing must therefore be carried out within a chamber under pressure. If the inner walls of the plant itself are to be sterilized, it is necessary that the plant be designed to maintain and withstand such a pressure. This method therefore entails considerable technological complications and is very expensive.

The purpose of the present invention is to provide a method enabling the drawbacks of the priorly known methods to be eliminated, i.e. capable of ensuring complete destruction of all the microorganisms in the whole plant, without either having recourse to products which are harmful to human organism or using treatment chambers or sealed apparatuses capable of withstanding high pressures.

According to one feature of the method of the invention, a sterilizing fluid carried to a temperature higher than 100° C and comprised for instance between 120 and 130° C, is made to circulate in the said plant, the said sterilizing product being constituted, at least partially, by a compound selected for instance among the compounds of the polyalcohol group and having, at temperatures higher than 100° C. and in particular in the aforementioned range of temperatures, a vapor tension lower than atmospheric.

The method according to the invention therefore enables to reach sufficient temperatures to destroy the bacteria in either vegetative or sporulated form, and this at atmospheric pressure, i.e. without there being any need to have recourse to equipments capable of withstanding high pressures.

According to another feature of the invention, the aforesaid compound is a poly-alcohol miscible with water and the aforesaid sterilizing fluid is a homogeneous mixture of water with the said poly-alcohol.

By selecting among the poly-alcohols those which are miscible with water, a solution is readily obtained whose boiling temperature depends upon the respective proportions, by weight, of the water and the poly-alcohol used. In particular, by selecting the said proportions in a suitable manner, a solution can be obtained whose boiling temperature exceeds 130° C., which allows it to remain in liquid phase at atmospheric pressure.

According to still another feature of the invention, the aforesaid sterilizing fluid is used alternately in vapor phase and/or in liquid phase.

The mixture in the form of vapor allows to rapidly reach the sterilizing temperature and allows to rapidly and efficiently sterilize certain apparatuses such as tanks or containers, whereas the use of the mixture in liquid form, whose poly-alcohol concentration is higher than that of vapor owing to the higher boiling temperature of the poly-alcohols used, allows to efficiently sterilize certain complicated mechanical parts, so that the use of both phases, vapor and liquid, allows efficient treatment of the most complicated plants.

According to still another feature of the invention, the aforesaid poly-alcohol is one of the following compounds: monoethylene glycol, diethylene glycol, triethylene glycol, propylene glycol, glycerol.

The various products just mentioned offer various advantages: they are compatible with the health regulations concerning foodstuffs, in particular they are not harmful, they have a quite satisfactory lethal power (i.e. germ destructing power), they are not very corrosive and therefore do not attack the metals of the plant, their cost is relatively low and, lastly, they are readily recoverable.

Other features and advantages of the invention will appear from the following, more detailed description of the method of sterilizing a product-dispensing plant of any type, shown diagrammatically in the appended single drawing.

In the said drawing there is shown a plant, which may be for instance a milk packaging or conditioning plant, comprising essentially a sealingly closed chamber 1 made from any material, for instance metal, within which is placed an apparatus 2 provided for instance with a set of proportioning pumps and receiving, through a piping 3, a previously sterilized product (in the case considered, milk) which the said apparatus dispenses in proportioned amounts into receptacles (not shown).

It is desired to sterilize, on the one hand, the chamber 1 and, on the other hand, the apparatus 2 as well as the piping 3 connected therewith. The method according to the invention consists in carrying out the sterilization by raising the temperature of the chamber 1, the apparatus 2 and the piping 3 to a value exceeding the temperature which the various micro-organisms can withstand, i.e. a value equal to at least 100° C. and which may be comprised advantageously between about 120 and 130° C. Otherwise stated, it is desired to carry out thermal sterilization without however such a temperature being subject to pressures higher than atmospheric, as is the case when water is used as a sterilizing agent.

The problem to be solved therefore consists in using, for the said thermal sterilization, a sterilizing agent having at least partially the following characteristics:

relatively low vapor tension at the required sterilization temperature, i.e., a boiling temperature far from the said sterilization temperatures;

no harmful effect on human organism, according to the regulations concerning food-stuffs;

lethal power preferably higher or at least not much lower than that of water at the same temperature;

miscibility with water in order to enable the chamber and apparatus to be washed with water which, of course, is the most economical product for this washing operation;

corrosiveness as low as possible with respect to the materials, metals, plastics, etc... constituting the chamber and the apparatus;

relatively low cost;

easy and economical recovery.

Numerous tests effected on various products have allowed to select a certain number of compounds of the poly-alcohol group as being capable of ensuring the aforementioned advantages. Among such products monoethylene glycol (called hereinafter "glycol"), diethylene glycol, triethylene glycol, propylene glycol and glycerol have been selected more particularly.

Indeed, all of these products have a boiling temperature under atmospheric pressure much higher than that of the water with which they are miscible, so that they enable a solution to be obtained whose concentration is so adjusted as to ensure a selected value of its boiling temperature, in particular a value higher than 130° C.

Experience has also shown that among the said products, glycol in particular may be used quite advantageously for the carrying out of the sterilizing method according to the invention. Indeed, glycol has high lethal power, much higher, at equal temperatures, than that of water, whatever the concentration used may be, thus enabling a chemical effect to be added to thermal sterilization. Owing to this high lethal power, the duration of the sterilization may be much shorter, at the same temperature, than when water is used, thus offering an additional advantage. Moreover, glycol is particularly easy to recover.

As a non limitative example, the process of sterilizing a plant such as shown in the appended drawing, using the method of the invention, may be carried out as follows:

1. Washing of the apparatus 2 and the piping 3 with a view to eliminating the impurities and deposits likely to have accumulated in the various portions of the said apparatus and the said piping, by introducing into a pipe 4 connected with the piping 3 a washing agent constituted preferably by water whose temperature is close to the packaging or conditioning temperature of the product. The washing agent is discharged through the discharge pipe or siphon 6.

2. Cleaning of the said apparatus and piping by introducing into the pipe 4 a detersive solution such as for instance an alkaline solution.

3. Further washing of the apparatus and piping by introducing into the pipe 4 a washing agent, preferably water, at a temperature on the order of, for instance, 70° C.

4. Carrying the temperature of the apparatus and piping to the required value by introducing water at 80° to 90° C. into pipe 4, the said water therefore being in liquid phase at atmospheric pressure.

The various preceding operations are those which are generally used at present for the cleaning of the plants. According to the chemical nature of the products to be packaged or conditioned, the detersive solution, instead of being an alkaline solution as mentioned, may be replaced by an acid solution. One may also carry out a cleaning with an alkaline solution and then a cleaning with an acid solution, each of these cleanings being of course followed by a washing. It is known that, in any case and whatever the detersive solutions used may be, such a cleaning does not lead to complete destruction of all the micro-organisms, but on the contrary allows a non-negligible number of them to subsist, so that the apparatus thus cleaned can be considered as highly hygienic, but cannot be considered as sterile. In order to ensure complete sterilization, the following complementary operations are therefore carried out according to the invention:

5. Introduction into the plant of a homogeneous mixture of water with glycol carried to a temperature comprised for instance between 120° and 130° C., the said mixture being introduced:

a. in the form of water vapor loaded with glycol introduced through a pipe 7 opening within the chamber 1;

b. in liquid form, a relatively concentrated solution of glycol in water being introduced into the pipe 4.

The introduction of vapor and liquid at 120° and 130° C. of course leads to a rise of temperature within the casing 1 as well as the apparatus 2 and the piping 3 which reach this same temperature in a few moments. The liquid introduced into the apparatus and the condensate resulting from the vapor introduced into the chamber are discharged through the discharge pipe 6. This operation, which is the sterilizing operation proper, continues during a more or less long time depending upon the temperature of the vapor, so as to ensure complete destruction of the microorganisms (this duration may be for instance from 5 to 10 minutes at a temperature of 125° C.).

6. Cooling of the plant by a. stopping the input of vapor through the pipe 7;

b. introducing into the pipe 4 a homogeneous mixture of glycol and water previously sterilized, the mixture being at a temperature on the order of 90° C.

7. Washing of the plant by a. introducing, at atmospheric pressure, sterilized water vapor through the pipe 7, thus eliminating the glycol deposit through condensation;

b. introducing, through the pipe 4, previously sterilized liquid water at a temperature of about 90° C.

in order to eliminate the glycol from the apparatus and piping.

8. Final cooling by
   a. stopping the input of water vapor into the pipe 7;
   b. introducing cold or relatively cold water, previously sterilized, through the pipe 4;
   c. introducing a previously sterilized, cold or relatively cold gas, for instance air, or a neutral gas such as nitrogen, through the pipe 8 opening, as the pipe 7, into the chamber 1.

When the whole plant is thus correctly sterilized and cooled, the packaging or conditioning of the sterile product such as milk or the like, may be carried out by introducing the same into the pipe 3. The first amounts of milk or the like conveyed into the plant and which dry the remaining sterile water may also be eliminated through the discharge pipe 6.

It is obvious that many modifications may be effected in the different operations described above.

For instance, during operation 5, only the concentrated glycol liquid may be fed without injection of vapor or, inversely, only vapor loaded with glycol without liquid may be fed, depending on the characteristics of the plant to be sterilized, in particular the complexity of the apparatus, and according to whether a more or less rapid increase of the temperature of the plant is desired.

The duration of operation 5, i.e. the duration of sterilization, may vary considerably according to the temperature of the sterilizing fluid, its lethal power, etc...

The duration of the cooling operations may vary according to the desired final temperature, and the same goes for the duration of washing according to the importance attached to the said washing. Final cooling may in certain cases be unnecessary, for instance if the product is packaged in the hot state.

Owing to the use of poly-alcohols, the boiling temperature of which is much higher than the range of sterilization temperatures, i.e. a range which may be considered as comprised between 110° and 140° C., it is always possible to form a water-poly-alcohol mixture whose boiling temperature remains much higher than the sterilization temperature, even if the sterilization is effected at a relatively high temperature. It is sufficient to start with a solution of suitable concentration in order to be able, on the one hand, to carry the temperature of the solution to the desired value before it begins to boil, so as to use it in liquid phase in the circuit, and, on the other hand, to obtain through previous boiling a vapor whose temperature is sufficient to act, during condensation, upon the apparatus walls.

It should be noted that the saturated vapor has an initial concentration which depends directly upon the desired sterilization, whereas the liquid solution, in order to remain in liquid phase, must have a concentration higher than that of the solution which would begin to boil at the selected sterilization temperature.

Lastly, it should be noted that, as compared with water, the use of glycol whose lethal power is very high allows to obtain shorter sterilization periods at equal temperatures, or to operate at lower temperatures during equal periods. Since glycol begins to boil at about 200° C. under atmospheric pressure, the process may be started with a water-glycol solution containing for instance 90 percent glycol and 10 percent water (by weight).

It should be noted that the method described is by no means limited to the sterilizing of milk packaging plants, and that it may be used for all plants dispensing or handling any product whatsoever, be it a foodstuff or not, and whatever the number of apparatuses and pipings in the said plant may be.

Of course, the invention is by no means limited to the forms of embodiment described and illustrated which have been given by way of example only. In particular, it comprises all means constituting technical equivalents to the means described as well as their combinations, if the latter are carried out according to the spirit of the invention.

I claim:

1. Method of sterilizing microorganisms contamination in an industrial plant having a sealingly closed chamber, an apparatus located within said chamber for dispensing a previously sterilized liquid food product, pipe means connected to said apparatus for delivering said liquid food product to the latter and discharge means connected to said chamber, comprising the steps of introducing into said plant a sterilizing fluid elevated to a temperature in a range higher than 100°C. in order to perform a thermal sterilization, circulating said sterilizing fluid in said plant for a sufficient period of time to ensure complete destruction of the microorganisms therein, said sterilizing fluid comprising a vapor phase and a liquid phase, and being constituted by a homogeneous mixture of a polyalcohol in water said mixture having a vapor tension, at a temperature within the aforesaid range of temperatures, lower than atmospheric pressure, and discharging said liquid and the condensate resulting from the vapor through said discharge means.

2. Method according to claim 1 wherein said polyalcohol is selected from the group consisting of: monoethylene glycol, diethylene glycol, triethylene glycol, propylene glycol and glycerol.

3. Method according to claim 1, wherein said sterilizing fluid is at a temperature of from 120°C. to 130°C.

4. Method according to claim 1 wherein said vapor phase is introduced into said chamber whereas said liquid phase is introduced into said pipe means for circulation in said apparatus.

5. Method according to claim 1 further comprising the step of circulating a previously sterilized mixture of poly-alcohol with water in the said plant after the sterilization has been performed, the said mixture being at a temperature of about 90°C.

6. Method according to claim 5, further comprising the step of circulating sterile rinsing water in said plant, after the circulation of said sterilized mixture of polyalcohol with water.

7. Method according to claim 6, wherein said sterile washing water is supplied in the form of sterilized vapor at 100°C. and in the form of previously sterilized liquid water at a temperature of about 90°C.

8. Method according to claim 1, further comprising the step of circulating previously sterilized water in said pipe means and said apparatus and simultaneously admitting previously sterilized gas to said chamber after the circulation of said sterilizing fluid, said previously sterilized water and said previously sterilized gas having a temperature approximating the temperature at which the said product circulates in said plant.

9. Method according to claim 8, wherein said gas is air.

10. Method according to claim 8 wherein said gas is an inert gas.

11. Method according to claim 10, wherein said inert gas is nitrogen.

* * * * *